United States Patent
Ferreira et al.

(10) Patent No.: US 6,548,031 B1
(45) Date of Patent: Apr. 15, 2003

(54) METHOD FOR PURIFYING A GAS STREAM

(75) Inventors: Claudemiro Ferreira, Zuzwil (CH); Urs Georg Naef, Neftenbach (CH); Camille Borer, Flurlingen (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 09/700,291

(22) PCT Filed: Jul. 19, 1999

(86) PCT No.: PCT/CH99/00332
§ 371 (c)(1),
(2), (4) Date: Dec. 21, 2000

(87) PCT Pub. No.: WO00/07698
PCT Pub. Date: Feb. 17, 2000

(30) Foreign Application Priority Data

Aug. 4, 1998 (DE) .......................................... 198 35 186

(51) Int. Cl.[7] .............................................. B01D 53/34
(52) U.S. Cl. ............. 423/210; 423/245.3; 423/DIG. 5; 422/105; 422/110; 422/111; 422/168; 422/177
(58) Field of Search .................... 422/105, 110, 422/111, 168, 177; 423/210, 245.3, 351, DIG. 5; 523/272, 274

(56) References Cited

U.S. PATENT DOCUMENTS 4,950,476 A * 8/1990 Su et al. ................. 423/213.7
5,547,652 A * 8/1996 Ghisolfi et al. ........... 423/245.3
5,612,011 A * 3/1997 Ghisolfi et al. ........... 423/245.3
5,738,835 A * 4/1998 Brueck et al. .............. 423/210
5,893,039 A * 4/1999 Pfefferle ...................... 701/103

FOREIGN PATENT DOCUMENTS

DE  195 06 012 A1 * 8/1996
EP  0 699 471 A1 * 3/1996

* cited by examiner

Primary Examiner—Stanley S. Silverman
Assistant Examiner—Timothy C. Vanoy
(74) Attorney, Agent, or Firm—Francis C. Hand; Carella, Byrne at al.

(57) ABSTRACT

The invention relates to a method for purifying a gas stream containing impurities composed of organic compounds, said gas stream flowing out of a reactor (1) designed for solid phase condensation, preferably for aromatic polyesters and polyamides. According to said method, a gas containing at least oxygen is fed to the gas stream containing the impurities. The combined gas stream is then conveyed, at a high temperature, especially from 280° C. to 380° C., onto a catalyst (8) containing rhodium or a rhodium alloy on an inert porous support. It was found advantageous that the amount of oxygen used be hypo stoichiometric, in relation to the organic impurities, and/or that the ratio of oxygen to impurities be controlled by means of a lambda probe (A). Such a lambda probe (A) is used in a facility according to the invention.

10 Claims, 2 Drawing Sheets

METHOD FOR PURIFYING A GAS STREAM

Figure 1:
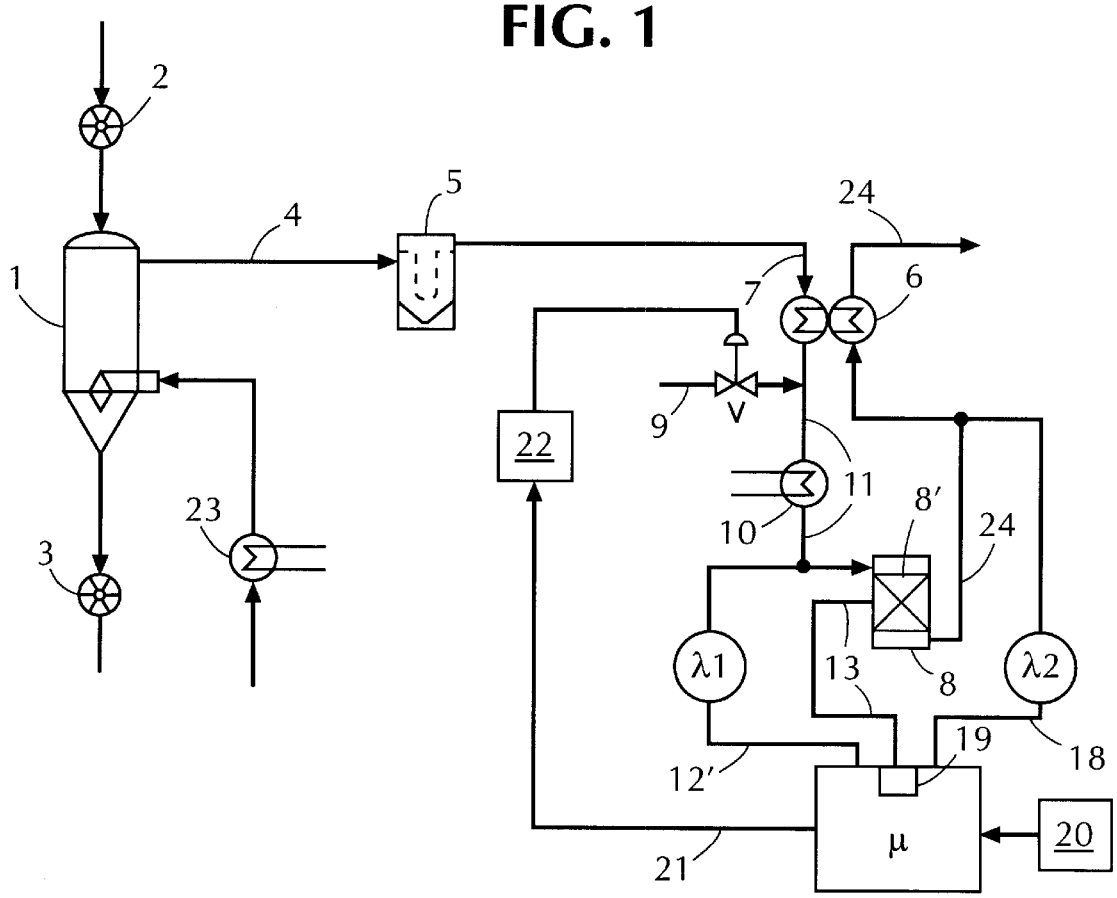

This invention relates to a method of purifying a gas flow. More particularly, this invention relates to a method and apparatus for purifying a gas flow from a reactor performing solid phase condensation of a polyester resin.

Methods and arrangements of this type are known from U.S. Pat. Nos. 5,547,652 or 5,612,011. These deal with the purification of the process exhaust gases by means of a catalyzer (in contrast to purification by gas washing) or, in other words, with the afterburning (oxidation) of impurities. It goes without saying that, for this reason, the ratio of oxygen to impurities is of the greatest importance. In this regard, two considerations were hitherto decisive: On the one hand, one assumed that a minimal stoichiometric amount of oxygen was necessary for complete oxidation of the impurities. On the other hand, it was thought that, in light of this requirement, the monitoring of the amount of oxygen was the best method for keeping the purification process under control.

Over time, it was found that in spite of the addition of a stoichiometric amount of oxygen, complete oxidation did not occur, so that the first-mentioned patent still allowed at least 10 ppm of nonburned oxygen. This also proved to be non-optimal with regard to the purification effect, which was the reason that the excess of oxygen was increased yet again. In the results of the second patent, an even higher amount of nonburned oxygen of 250 ppm had to be tolerated; however, it was thought that an optimal solution had been provided.

Both of the named patents relate to the purification of process gases during the production of aromatic polyesters. Naturally, gas purification is of particular interest in aromatic compounds and especially in polyesters; still, it is obvious that such purification methods may also be used with other gases and impurities, e.g., polyamides like aromatic PA or also for the purification of exhaust gases during the processing of natural substances, such as, the roasting of coffee or cocoa.

The present invention now goes in the opposite direction. This basically means that instead of placing the amount of oxygen in the foreground, the amount of the residual impurities is taken as the measuring stick or rather, the ratio of oxygen to residual impurities. This first step of the invention subsequently resulted in surprising findings. On the one hand, tests by the applicant showed that-in direct contradiction to previous observations by the specialists-stoichiometric or hyper-stoichiometric oxygen amounts do not lead to optimal purification and that the previous measures not only necessitate a large amount of oxygen (if one does not simply use air), but, rather, the entire system became oversized and too expensive. On the other hand, it was proven that the previously used measuring principle was based on incorrect assumptions and thereby finally delivered inexact results.

Briefly, the invention provides a method comprising the steps of directing a flow of an exhaust gas from a reactor performing a solid phase condensation of a polyester resin through a first line to a catalyzer. In addition, a flow of gas containing a hypo-stoichiometric amount of oxygen is delivered into the flow of exhaust gas at a predetermined point upstream of the catalyzer for oxidizing impurities in the exhaust gas within the catalyzer. In accordance with the invention, the exhaust gas is quantitatively analyzer with a lambda probe and a signal is emitted that corresponds to a measurement of the purity of the exhaust gas. The lambda probe is disposed in one of the catalyzer and the flow of exhaust gas downstream of the predetermined point. The amount of oxygen-containing gas delivered into the exhaust gas flow is controlled in dependence on a deviation of the emitted signal from a set signal. The invention is further directed to an apparatus comprising a reactor for solid phase condensation of a polyester resin, an exhaust line extending from the reactor for removing exhaust gas from the reactor, a catalyzer for receiving a flow of exhaust gas from the exhaust line and a second line connected to the first line for delivering a flow of oxygen-containing gas into the flow of exhaust gas in the first line upstream of the catalyzer for oxidizing impurities in the exhaust gas within the catalyzer. In accordance with the invention, a lambda probe is provided for quantitatively analyzing the exhaust gas and emitting a signal corresponding to a measurement of the purity of the exhaust gas. This lambda probe is disposed in one of the catalyzer and the first line downstream of the second line. In addition, a processor is provided for receiving the signal from the probe and for controlling the amount of gas delivered from the second line into the first line in dependence on a deviation of the signal from a set signal.

The preferred amount of hypo-stoichiometric oxygen is 98% to <100%, preferably at least 99%, of the stoichiometric amount.

It is completely surprising that even a hypo-stoichiometric amount of oxygen leads to a better result, and the theoretical explanation for this phenomenon does not yet exist. Tests have, however, confirmed this fact; namely, hardly any further measurable residual impurities or residues of nonburned oxygen are being determined. Naturally, it is difficult to still monitor such small residues at all. It has been shown that—if one actually wishes to carry the improvement with regard to purification to the extreme—the customary oxygen sensor delivers only imperfect results. For this reason, according to the invention, one plans to use a lambda probe. It is obvious, in this regard, that such a lambda probe enables better monitoring also in the case of the previously known method, when one utilizes stoichiometric or hyper-stoichiometric oxygen amounts, and that it is, however, particularly advantageous in those cases where the amounts to be monitored are especially small.

A lambda probe (according to R‚ömpps Chemical Lexicon, one writes "Λ" as the symbol for molar electrolyte conductibility) represents two noble-metal films, such as Pt, on a fixed electrolyte with connected electrodes. It is striking that this design is very similar to the catalyzer to be monitored. For this reason, it is completely possible within the framework of the invention to use the catalyzer itself as the lambda probe-like measuring head, wherein the monitoring signal must naturally be correspondingly filtered out, decoupled, or demodulated.

Regardless of how and where the lambda probe is inserted, an essential aspect of its usage is that only a direct measurement of the involved elements or electrolytes, instead of the hitherto indirect measurement, is now possible, wherein it must be added that the lambda probe exhibits particularly advantageous characteristic curves for an exact measurement. That it was previously not used had probably to do with the fact that one was so influenced by the stoichiometric or hyper-stoichiometric oxygen amount that it was thought that the nonburned oxygen must be measured. With the lambda probe, one is, on the other hand, also freer with regard to performing the method, since when the method according to the invention is used for processes other than the polycondensation of synthetic resins, an inert gas is possibly not required at all, wherein the measurement by the oxygen extant in the process would be further impaired in the case of the previous measurement method.

In any case, as is known, one can, however, use an inert gas as an impure gas, which is preferably at least partially recycled back into the reactor following purification.

To render the simple monitoring, which can be performed by the service personnel, into a quickly responding regulatory measure or at least enable such, it is certainly preferable that the monitoring occurs by means of at least one lambda probe in front of the catalyzer and/or that the monitoring occurs by means of at least one lambda proble on the catalyzer. Naturally, the monitoring of the final results of purification, that is, after the catalyzer, is of particular interest; however, such monitoring can also be additionally included in the regulatory measure.

Figure 2:
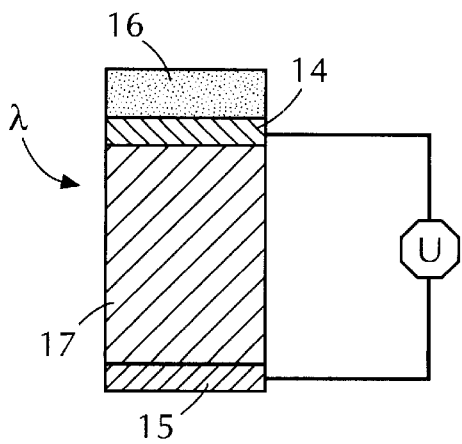
Figure 3:
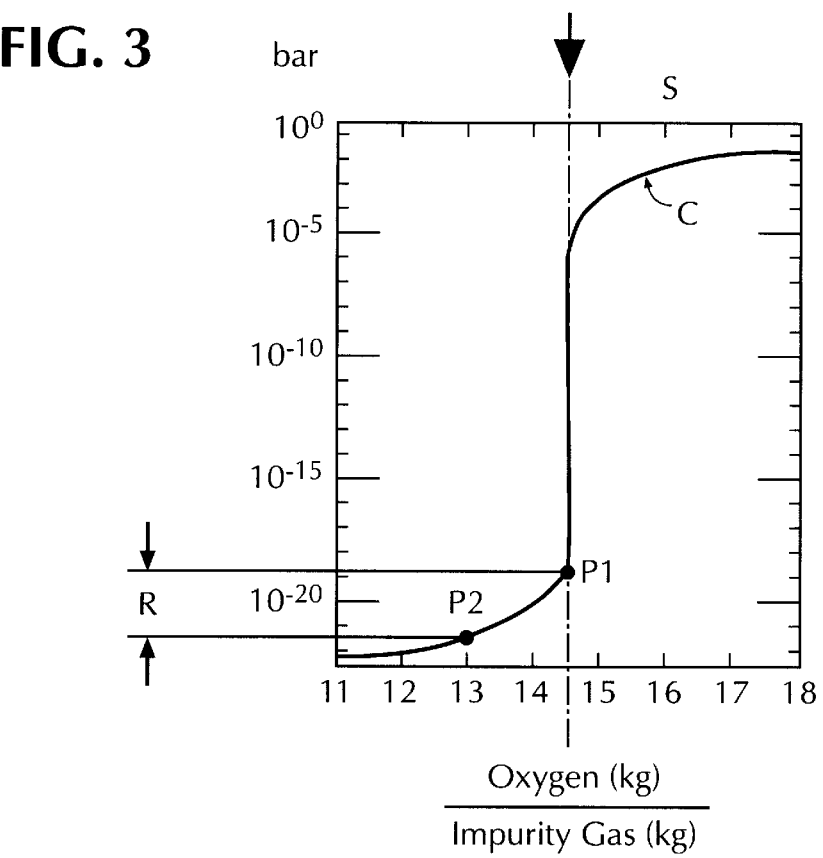

Further details of the invention are elucidated in the following description of an embodiment schematically shown in the drawing as well as in the embodiments given of the method. Shown are:

FIG. 1 A schematic of the method underlying the invention with an embodiment according to the invention;

FIG. 2 The design of a lambda probe used according to the invention;

FIG. 3 Its characteristic; and

Figure 4:
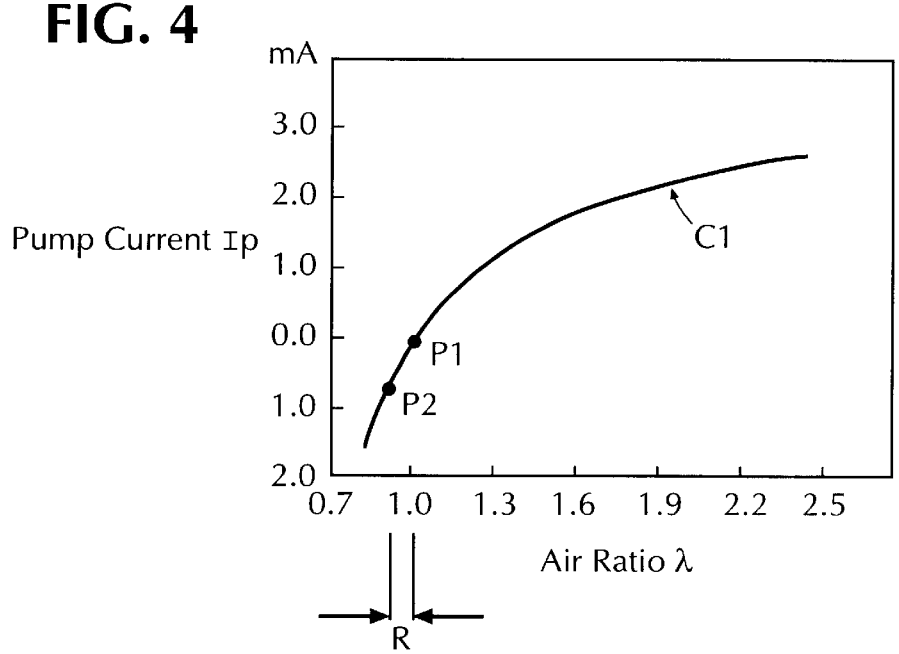

FIG. 4 A further characteristic of the lambda probe.

A reactor 1 is provided for the solid phase condensation of polyester resins, such as polyethylene-terephthalate. It is conventionally designed so that a detailed description is unnecessary, wherein the supply and removal of resin material occurs via cellular wheel sluices 2 or 3. The exhaust gas from the condensation process is guided through an exhaust gas line 4 first through filter 5 for removal of particle-shaped impurities. Afterwards the waste heat of this gas containing gaseous impurities is suitably exploited in a heat exchanger 6, which is provided in a supply line 7 to a catalyzer 8.

An air feeder 9 provides for the feeding of a gas containing at least oxygen, i.e., either pure oxygen or a gas such as air that contains only a corresponding portion of oxygen. This oxygen is needed for the oxidation of the impurities contained in the gas flowing through the supply line 7 and flows into the supply line 7 just in front of the catalyzer 8. The gas flows that are thus combined and guided in a collecting main 11 are, by means of an electric heater 10, effectively brought to an optimum temperature in front of catalyzer 8 for the oxidation occurring in catalyzer 8. This appropriately lies within the range of 280° C. to 380° C. Finally, the collecting main 11 enters the catalyzer 8. The catalyzer unit 8, 8' also exhibits an output line 24, which advantageously leads back to the reactor, e.g., via a heater 23 or, prior to that, via a heat exchanger 6, particularly then when—as is common in polycondensation—the gas that is to be purified is an inert gas, such as nitrogen.

Just in front of the entrance to the catalyzer 8, a lambda probe $\Lambda_1$, which splits up the combined gases into their electrolytes or elements and quantitatively analyzes them, lies on the collecting main 11. According to this analysis, a corresponding, preferably digital, output is sent over an electric conductor 12. In the depicted embodiment, however, still another electrical conductor 13 is provided that is directly connected to the catalyzer 8.

The catalyzer body 8' is designed similarly to the lambda probe $\Lambda$ shown in section in FIG. 2, i.e., a porous inert conduit layer 16 is provided, upon whose surface a noble-metal film 14 is applied. The lambda probe also has a solid electrolyte 17, which is coated with a noble-metal film 15. The electrolyte 17 can, for example, be comprised of zirconium oxide $ZrO_2$, whereas films 14 and 15 exhibit mostly Pt, i.e., consist either completely of platinum or of an alloy. While, for example, palladium alloys are customary, according to the invention, a rhodium alloy is preferably provided for the catalyzer body 8'. On the other hand, the lambda probe itself can exhibit pure platinum films 14, 15. Between the films 14 and 15, a direct voltage U is applied, which creates the desired electrolyte effect. In this case, the gas to be tested is located on the side of the film 14, whereas air (as reference) is located on the side of the noble-metal film 15.

Based on the similar design of the probe $\Lambda$ and the catalyzer 8, it is conceivable that the catalyzer 8 itself may be used as a lambda probe-like measuring system, i.e., for determining the electrolytes, and the output signal thereby obtained is delivered to the conductor 13 (FIG. 1).

An additional lambda probe $\Lambda_2$, namely at the exit of catalyzer unit 8, 8', can be provided either alternatively or cumulatively. This can measure the result of the purification and deliver a corresponding signal to a conductor 18. It goes without saying that perhaps also only a single lambda probe needs to be used, just as it also lies conversely within the framework of the invention to provide additional measuring points with lambda probes. When the lambda probe $\Lambda_2$, however, also measures the attained result, then one cannot overlook the fact that, in the course of the gas flow, it measures only at a relatively late time, which may be impractical for a quick regulation. For this reason, it can be advantageous to provide a differential element in the conductor 18, in order to more quickly recognize the tendency toward a possible deviation. On the other hand, it is generally more advantageous for a quick regulation, if at least the lambda probe $\Lambda_1$ is used. Using both lambda probes $\Lambda_1$ and $\Lambda_2$ results in the additional advantage of being able to determine the ageing of the catalyzer that affects the measurement result, as was already determined in automobile catalyzers (Hansjörg Germann et al., "Differences in Pre- and Post-Converter Lambda-Sensor Characteristics", *Electronic Engine Controls* 1996, SP-1149, pp. 143–147).

In the depicted embodiment with three measuring points, the electrical conductors 12, 13 and 18 lead to a processor $\mu$ that directly receives the signals of conductors 12 and 18 (inasmuch as they are already digitally available) or has respectively an analog/digital converter at its input. With respect to conductor 13, a pre-processing of the measurement signals being fed through it is generally required, in order to separate them from random noise signals or other such things. This can be performed in a filter, a demodulator, or a (commonly) signal-shaper step 19 at the input of the processor $\mu$.

In the processor $\mu$ the chronological sequence of the measurements should first be considered. The sequence becomes shorter (and thereby less relevant for the regulation) as the flow speed of the gases increases. If necessary, the signals being received through conductors 12, 13, and 18 are also weighted before they are compared to a set signal from a, preferably adjustable, set-point transmitter 20. Resulting from the outcome of this comparison is a deviation or control signal, which is conveyed from the output of the processor $\mu$ via a conductor 21 to a regulator 22. The regulator 22 favorably adjusts a valve V in the conductor 9 in a corresponding manner.

The design of the lambda probe $\Lambda$ was already described above using FIG. 2. The advantage of using such a probe does not rest lastly in the fact that it exhibits a very high transconductance characteristic, as is apparent in FIG. 3. Therein, the equilibrium oxygen-partial pressure is plotted in bar on the ordinate, on the abscissa, the ratio of oxygen to the impure gas to be burned. Alternatively, the output voltage of the respective lambda probe can be plotted (see the values for $\Lambda_2$ in Table 2), in which case curve C reverses and tapers off from the upper left to the lower right.

The lambda probe Λ now has one characteristic C that shows an especially steep increase precisely in the area of a dash-dot line S. Line S corresponds to a stoichiometric ratio of oxygen to impure burning gas. At the left of this line S lie the values of a "rich mixture", i.e., here lies the hypo-stoichiometric area with low oxygen amounts where the invention is used. If a stoichiometric oxygen amount is assumed to be 100%, then to the left is the range of 99% downwards, whereas to the right lie the hyper-stoichiometric areas corresponding to an oxygen amount of >100%. Accordingly, in the case of an regulation according to the invention, regulations are appropriately made in an area of curve C, which lies between two point P1 and P2, whose spacing corresponds to a regulatory range R.

An additional characteristic of the lambda probe is apparent from FIG. 4.

In an undepicted, but well-known, oxygen sensor, the components of the exhaust gas are diffused through a diffusion channel onto the electrodes of a pump and Nernst cell. An electronic control detects the Nernst voltage and supplies the pump cell with a variable pump voltage. This control circuit is designed in such a way that the exhaust mixture in the area of the electrodes is held to a constant value of Λ=1. The regulator compares the measured Nernst voltage to a set value and provides the pump cell with such a current that the oxygen concentration more and more approximates the set value.

FIG. 4 is used to depict how the pump current is dependent upon Λ and is thereby a measure for the oxygen concentration in the exhaust gas. Therein the pump current in $I_p$ is registered on the ordinate, the air ratio of the exhaust gas in Λ on the abscissa.

In the lean area, an increasing oxygen concentration leads to a linear increase of the pump current. A similar linear characteristic, though with a reverse current direction is obtained in the rich area. The results of this are that, within the desired range of 0.98<Λ<1.00, the pump current is a monotonic increasing function dependent upon lambda.

The self-regulating pump current $I_p$ is a measure for lambda and thereby also a measure for the actual oxygen concentration in the exhaust gas. In the case of the regulation according to the invention, it is correspondingly effectively regulated in an area of curve $C_1$, which lies between points P1 and P2 in FIG. 4, whose spacing corresponds to a regulatory range R.

In the following, examples are provided to illustrate the method according to the invention and its results.

EXAMPLE 1

A certain uncertainty factor in a catalytic conversion is the effective conversion value of the catalyzer itself. Generally all 100% of the impurities namely are not oxidized. Assuming that the gas mixture conveyed through supply line 7 contained 500 ppm (volume) of ethylene glycol and nitrogen, then purely stoichiometrically 1250 ppm oxygen would have to be added. The lambda value would then amount to exactly 100% (factor 1.0). If, however, the conversion value of catalyzer 8 was only 99%, then the remaining concentration of the oxygen not involved in the burning process after the catalyzer would still be 12.5 ppm, and correspondingly, that of unburned impurities, namely ethylene glycol, 5 ppm. For this reason, an initial test series was performed (see Table 1), in order to determine the residual concentrations of oxygen in the named gas mixture.

TABLE 1

| Test No. | Factor of the Stoichiometric Oxygen Amount | Residual Oxygen for Catalytic Conversion of | | |
|---|---|---|---|---|
| | | 100% | 99% | 95% |
| 1.1 | 1.01 | 12.5 | 25.0 | 75.0 |
| 1.2 | 1.00 | 0.0 | 12.5 | 62.5 |
| 1.3 | 0.99 | 0.0 | 0.0 | 50.0 |

In this table, to so-called lambda factor, i.e., the factor of the stoichiometric oxygen amount, was utilized. A test system of the type shown in FIG. 1 was employed, wherein only the lambda probe $\Lambda_2$ was used, in order to determine the residual oxygen content in ppm. The lambda probe was a Bosch product, type LSM 11. For this, a state-of-the-art Pt catalyzer was used, for which a conversion of 95% was known. The values for 100% and 99% were calculated on the basis of the found oxygen amounts.

Initially, in test 1, an oxygen excess of 101% of the stoichiometric amount was used, corresponding to U.S. Pat. No. 5,547,652. As expected, this resulted in a relatively high residual oxygen content of 75.0 ppm. Afterwards, in test 2, the stoichiometric oxygen amount of 100% was examined. During this test No. 2, a residual oxygen amount of 62.5 ppm was still measured. Only in the case—which does not occur in practice—of a 100% catalytic conversion of the gas ethylene glycol to be oxidized, a residual oxygen amount of 0 ppm would result.

Now, however, a test series with tests in the hypo-stoichiometric range was continued. The table shows only the values for the lambda factor 0.99, in which there still results a residual oxygen content of 50.0 ppm. In further tests not described herein, up to a factor of 0.90, however, also all residual oxygen disappeared or was no longer measurable. In this case it was interesting to determine that only at 95% did a residue oxygen content of 0 ppm (95% catalytic conversion) remain. Still further tests on even smaller portions of oxygen were performed, wherein—allowing for tolerances—evidently 90% of the stoichiometric oxygen formed the lower limit, for which measurement results could be kept above zero. The table certainly shows that in the case of a higher catalytic conversion, e.g., one of 99%, even when the oxygen content was only 99% of the stoichiometric amount, a residual oxygen content of zero could be maintained; still, such a conversion is not possible under all conditions.

EXAMPLE 2

The next question to arise was how the amounts of ethylene glycol and other impurities would appear at the exit of catalyzer 8. One would expect that with decreasing residue oxygen content, the amount of nonburned ethylene glycol would increase. Therefore, a test design was chosen in which both lambda probes $\Lambda_1$ and $\Lambda_2$ were installed. The following Table 2 shows the sequence of the test series, wherein not only the oxygen ($O_2$) in ppm, but also the content of ethylene glycol (EG) in μg/l, and of acetaldehyde (AA) in μg/l, were measured with the lambda probe $\Lambda_1$ as well as $\Lambda_2$, and the content of hydrocarbon only on $\Lambda_2$. The values for residual amounts of these impurities are the values given in ppm v, i.e., volume parts per million. The value given in the last column on the right is in each case the electric output signal of the probe $\Lambda_2$ in millivolt, which is a measure for the lambda factor.

were additionally measured separately in front of and behind the catalyzer.

The measurements of the emission gas by the gas-phase chromatograph (GC) confirm that no ethylene glycol (EG) and no acetaldehyde (AA) are present.

TABLE 2

| Test No. | $\Lambda_1$-Factor | Values at $\Lambda_1$ | | | Residual Values at $\Lambda_2$ | | | | mV at $\Lambda_2$ |
|---|---|---|---|---|---|---|---|---|---|
| | | [EG] ppm v | [AA] ppm v | [O$_2$] ppm v | [EG] ppm v | [AA] ppm v | [O$_2$] ppm v | [HC]$^2$ ppm v | |
| 2.1 | 1.02 | — | — | 1420 | — | — | >1000 | 1.5 | 93 |
| 2.2 | 1.01 | 30.4 | 7.1 | 165 | <1.6 | <1.3 | 20 | 1.2 | 180 |
| 2.3 | 1.01 | 30.8 | 6.9 | 155 | <1.6 | <1.3 | 10 | 0.9 | 189 |
| 2.4 | 1.01 | 31.9 | 6.9 | 140 | <1.6 | <1.3 | 1.1 | 1.5 | 835 |
| 2.5 | 1.00 | 27.4 | 6.6 | 105 | <1.6 | <1.3 | 1.1 | 1.2 | 858 |
| 2.6 | 0.98 | 26.9 | 6.3 | 95 | <1.6 | <1.3 | 1.0 | 1.6 | 875 |
| 2.7 | 0.97 | 29.0 | 6.6 | 88 | <1.6 | <1.3 | 1.0 | 2.1 | 880 |
| 2.8 | 0.95 | 23.9 | 6.3 | 76 | <1.6 | <1.3 | 1.0 | 2.3 | 886 |

$_1$The values of EG and AA lay below the measurable minimum value.
$_2$In the case of HC, the ppm v of organic carbon was determined.

Table 2 above shows that during hypo-stoichiometric operation the residual values for EG and AA were disappearing in essentially equal amounts, as during stoichiometric operation (Test 2.5) or with an excess of oxygen (Tests 2.1 to 2.4), so that the previous conception of specialists proved to be incorrect. The residual values for hydrocarbons did in fact lie somewhat, but only minimally, above the residual value during an operation according to state-of-the-art. One can therefore say by and large that the advantages of the method according to the invention by far outweigh the minimally increased emission of HC. In particular, it is also apparent that a much more exact determination of the values of interest can be obtained here with the aid of lambda probes $\Lambda_1$ and $\Lambda_2$, which also makes possible a substantially more exact regulation and renders this meaningful for the first time. With this, however, gas purification can also be performed much more efficiently than was possible according to state of the art.

EXAMPLE 3

Furthermore, a test design was chosen in which both lambda probes $\Lambda_1$ and $\Lambda_2$ in FIG. 1 were installed. The following Table 3 shows the results of the test series in front of and after the catalyzer 8, wherein the content of hydrocarbons is equivalent (FID) to that of propane gas ($C_3H_8$).

Since carbon monoxide (CO) is also measured during FID analyses, carbon monoxide (CO) and carbon dioxide ($CO_2$)

TABLE 3

| | Inlet | | | | | Outlet | | | | | | |
|---|---|---|---|---|---|---|---|---|---|---|---|---|
| Trial # | $\Lambda_1$ — | $\Lambda_1$ ia | [FID]$_1$ ppm v | [CO]$_1$ ppm v | [CO$_2$]$_1$ % v | $\Lambda_1$ — | $\Lambda_1$ ia | [FID]$_0$ ppm v | [CO]$_0$ ppm v | [CO$_2$]$_0$ % v | [GC]$_0$ ppm v | [O$_2$]$_0$ ppm v |
| 1 | 0.999 | −1 | 62 | 72 | 6.5 | 0.999 | −3 | 8.8 | 1.9 | 8 | 0 | 0 … 1 |
| 2 | 0.999 | −1 | 63 | 50 | 7 | 0.999 | −2 | 6.8 | 30 | 8.5 | 0 | 0 … 1 |
| 3 | 0.999 | −1 | 63 | 65 | 4.5 | 0.999 | −3 | 4.8 | 13 | 6 | 0 | 0 … 1 |
| 4 | 1.000 | 1 | 57 | 18 | 2 | 0.999 | 0 | 0.3 | 0 | 6 | 0 | 0 … 1 |
| 5 | 1.001 | 2 | 62 | — | — | 1.000 | 0 | 0.2 | — | — | 0 | 12 … 15 |

The above table shows that in the hypo-stoichiometric range (Tests 1–3), the residual impurities of FID lie only marginally above those during a stoichiometric operation (Test 4). Moreover, it is also apparent that the values of CO lay below the measurable minimal value during hyper-stoichiometric operation (Test 5).

Although oxygen is added to the exhaust gas in the hypo-stoichiometric range (Tests 1, 2, 3), the undesirable impurities are completely burned or remain in such small amounts as to no longer be measurable.

TERMINOLOGY AND SYMBOLS $\Lambda$, $\Lambda_1$, $\Lambda_2$, etc. Lambda probe
$\mu$ Processor
V Valve in Conduit 9
1 Reactor
2, 3 Cellular Wheel Sluices
4 Exhaust Gas Line
5 Filter
6 Heat Exchanger
7 Supply Lines to the Catalyzer
8, 8' Catalyzer Unit (8 Catalyzer, 8' Catalyzer Body)
9 Air Feeding
10 Electric Heater
11 Collecting Main
12, 13, 18, 21 Electrical Conductors
14, 15 Metal Films 16 Carrier Layer
17 Solid Electrolytes
19 Signal-Shaper Step on the Input of the Processor
20 Set Value Transmitter
22 Regulator
23 Heater
24 Output line

What is claimed is:

1. An apparatus comprising
   a reactor for solid phase condensation of a polyester resin;
   an exhaust line extending from said reactor for removing exhaust gas from said reactor;
   a catalyzer for receiving a flow of exhaust gas from said exhaust line;
   a second line connected to said exhaust line for delivering a flow of oxygen-containing gas into said flow of exhaust gas in said exhaust line upstream of said catalyzer for oxidizing impurities in said exhaust gas within said catalyzer;
   a lambda probe for quantitatively analyzing said exhaust gas and emitting a signal corresponding to a measurement of the purity of said exhaust gas, said lambda probe being disposed in one of said catalyzer and said exhaust line downstream of said second line; and
   a processor for receiving said signal from said probe and for controlling the amount of gas delivered from said second line into said exhaust line in dependence on a deviation of said signal from a set signal.

2. An apparatus as set forth in claim 1 further comprising a valve in said second line for controlling the flow of gas therethrough, said processor being connected to said valve to adjust said valve in response to said signal from said probe deviating from said set signal.

3. An apparatus as set forth in claim 1 wherein said probe is disposed in said exhaust line.

4. An apparatus as set forth in claim 1 wherein said probe is disposed in said catalyzer.

5. An apparatus as set forth in claim 1 wherein said catalyzer contains rhodium.

6. An apparatus as set forth in claim 1 wherein said catalyzer has an exit for purified gas leaving said catalyzer, and further comprising a second lambda probe at said exit for quantitatively analyzing said exhaust gas thereat and emitting a signal corresponding to a measurement of the purity of said exhaust gas thereat to said processor.

7. An apparatus as set forth in claim 1 wherein said processor is programmed to maintain the flow of oxygen-containing gas in an amount to provide a hypo-stoichiometric amount of oxygen in said exhaust gas flow delivered to said catalyzer.

8. A method comprising the steps of
   directing a flow of an exhaust gas from a reactor performing a solid phase condensation of a polyester resin through a first line to a catalyzer;
   delivering a flow of gas containing a hypo-stoichiometric amount of oxygen into said flow of an exhaust gas at a predetermined point upstream of the catalyzer for oxidizing impurities in said exhaust gas within the catalyzer;
   quantitatively analyzing said exhaust gas and emitting a signal corresponding to a measurement of the purity of said exhaust gas with a lambda probe disposed in one of the catalyzer and the flow of exhaust gas downstream of said predetermined point; and
   controlling the amount of oxygen-containing gas delivered into said exhaust gas flow in dependence on a deviation of said signal from a set signal.

9. A method as set forth in claim 8 wherein said amount of oxygen in said delivered gas is from 99% to less than 100% of stoichiometric.

10. A method as set forth in claim 8 further comprising the steps of quantitatively analyzing a flow of purified gas from the catalyzer with a second lambda probe, emitting a second signal corresponding to a measurement of the purity of said purified gas and controlling the amount of oxygen-containing gas delivered into said exhaust gas flow in dependence on a deviation of said second signal from a set signal.

* * * * *

UNITED STATES PATENT AND TRADEMARK OFFICE
CERTIFICATE OF CORRECTION

PATENT NO.    : 6,548,031 B1                                            Page 1 of 1
DATED         : April 15, 2003
INVENTOR(S)   : Claudemiro Ferreira et al.

It is certified that error appears in the above-identified patent and that said Letters Patent is hereby corrected as shown below:

Column 1,
Line 63, change "analyzer" to -- analyzed --

Column 2,
Line 41, change "R,ömpps" to -- Römpps --

Signed and Sealed this

Twelfth Day of August, 2003

JAMES E. ROGAN
*Director of the United States Patent and Trademark Office*